UNITED STATES PATENT OFFICE.

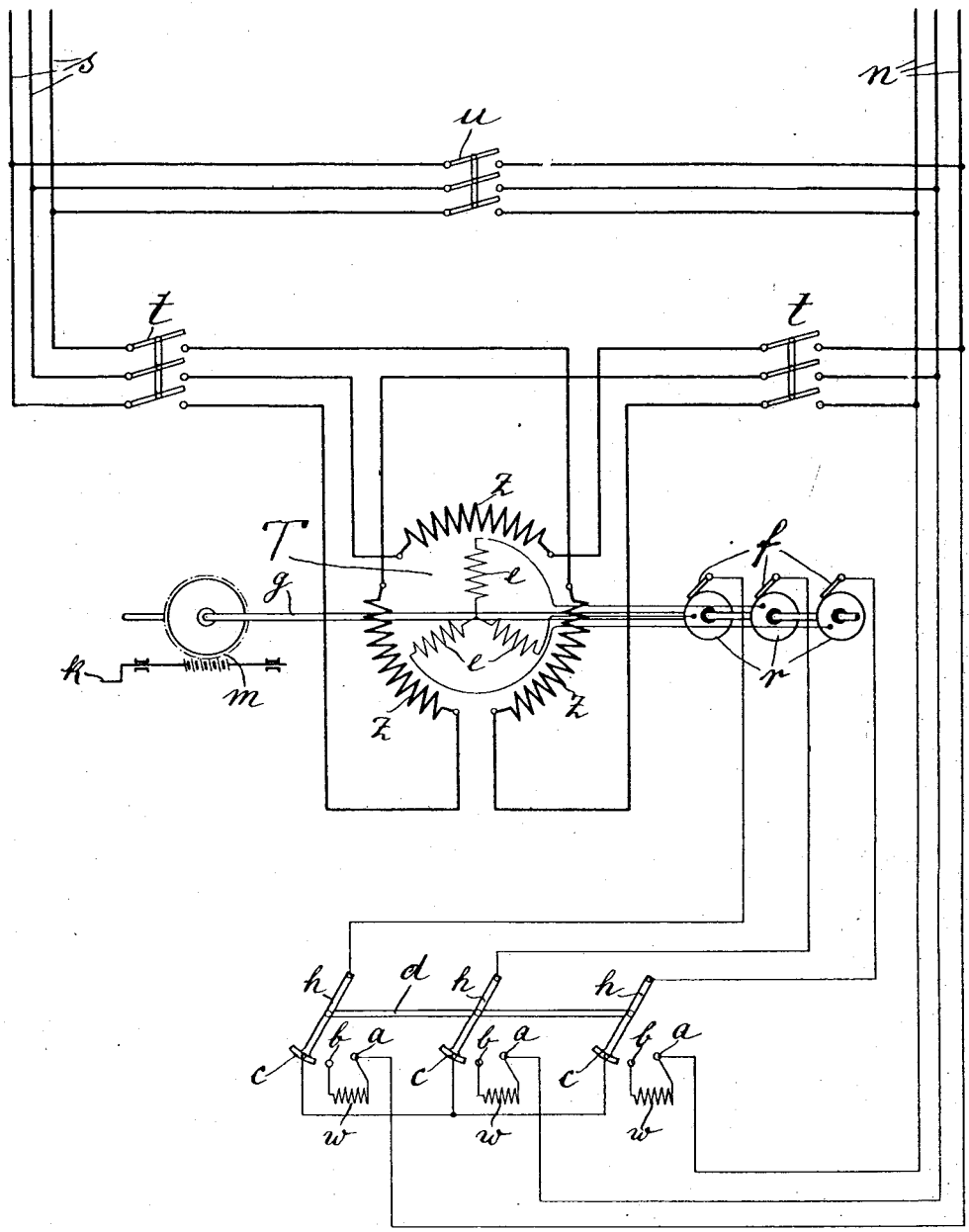

WILLY ZEDERBOHM, OF CHARLOTTENBURG, GERMANY, ASSIGNOR TO SIEMENS-SCHUCKERT-WERKE, G. M. B. H., OF BERLIN, GERMANY, A CORPORATION OF GERMANY.

MEANS FOR SWITCHING BOOSTER-TRANSFORMERS.

1,065,760.   Specification of Letters Patent.   Patented June 24, 1913.

Application filed October 19, 1911. Serial No. 655,485.

*To all whom it may concern:*

Be it known that I, WILLY ZEDERBOHM, a subject of the German Emperor, and residing at Charlottenburg, near Berlin, Germany, have invented certain new and useful Improvements in Means for Switching Booster-Transformers, of which the following is a specification.

My invention relates to means for switching booster transformers into and out of circuit.

In order to regulate the voltage in an alternating-current system use is frequently made of booster transformers whose one winding is connected in series with the mains while the other or exciting winding is connected across the mains of the machines or system. Phase shifting transformers are frequently employed for this purpose. In order that the system may be readily supervised and maintained it is preferable to arrange the booster transformers so that they may be completely separated from the system. There are, however, considerable difficulties in bringing about this separation during the operation of the system. If the series windings are first short-circuited by a conductor in order afterward to remove them from the system by means of switches, a short-circuit is made endangering the apparatus itself and reducing the voltage of the system to zero. If, on the contrary, the exciting winding is disconnected first, the series winding exercises a choking action on the current in the system and brings about a considerable fall of voltage.

The principal object of my invention is to provide means for readily and safely disconnecting booster transformers from, and connecting the same to the system.

One illustrative embodiment of the invention is represented as an example in the accompanying drawing, in more or less diagrammatical fashion.

In the drawing the series windings of the phase shifting transformer "T" are denoted with "z" and the exciting windings are denoted with "e". The series windings may be thrown between the line wires "n" and the bus bars "s" by means of switches "t". Besides a direct connection may be established between the line and the bus bars by closing switch "u". This latter switch, however, is open when the booster transformer "t" is in operation.

The form which the booster transformer "t" has in this arrangement is in itself known in the art and frequently designated as a so-called phase shifting transformer in which the exciting winding is disposed on a rotor and the secondary winding on a stationary core. The rotor may be oscillated through a suitable angle whereby the phases can be shifted any desired degree. In this particular case the rotor is diagrammatically represented by the exciting winding "e" and is disposed on a shaft "g" which may be operated in any well known manner, for instance, by the worm drive "m" actuated by the crank "k." At the other end of shaft "g" are provided three slip rings "r" to each of which one end of the three exciting windings "e" is connected, while the other ends of the exciting windings are connected together so that the exciting winding is connected in Y connection. On the slip rings "r" glide brushes "f" which are connected with the three-pole switch "h," the contacts "a" of which are connected with the line wires "n." The phase as previously stated being adjustable, its value, or in turn the value of the booster tension in the windings "z" may be adjusted at will relatively to the line tension. It is of course understood that the manner in which the two windings of the transformer are shifted relatively to each other is entirely immaterial in the present invention and the construction shown is only meant to represent an example.

The three-pole switch "h" has three contacts "a", "b", "c" for each lever "h". All contacts "c" are electrically connected with each other. The contacts "a" and "b" of each section are connected with each other by a resistance "w". Moreover each of the contacts "a" is connected with one of the three line wires "n".

It may now be assumed that the switch "u" is closed so that the line is directly connected with the bus bars and it may also be assumed that switches "t" are open so that the transformer is out of operation. In order to throw the transformer into the line, first the three levers "h" which are mechanically coupled by means of bar "d" are thrown to the right and onto their contacts "c" as shown, whereby the exciting windings "e" of the transformer are short circuited. Thereupon switches "t" are closed and switch "u" is opened. Windings "e" of the transformer being still short circuited the booster tension of windings "z" is still zero. Now three-pole switch "h" is thrown on to its contacts "b" whereby the exciting windings "e" are connected with the line over the resistance "w" and upon further movement of the switches "h" in the same direction onto their contacts "a" the exciting winding "e" is directly connected with the line wires "n." Now the booster windings "z" throw between the line tension and the tension at the bus bars a boosting tension the phase of which may be adjusted at will by shifting the exciting windings "e" relatively to the booster windings "z" as described above. Since now the line tension is added to or subtracted from the tension of the windings "z," the tension of the bus bars "s" may be varied relatively to the line tension double the amount of the booster tension in the windings "z." In order to disconnect the booster transformer the sequence of the above described operations is reversed. First three-pole switch "h" is thrown onto its contacts "c" in order to first short circuit the exciting windings whereupon switch "u" is closed and switches "t" are opened.

The described arrangement may of course be employed not only in the case of phase shifting booster-transformers which were specially mentioned in the introduction, but also in the case of stationary transformers with and without regulation by step switches.

I claim:

1. In an alternating current system the combination with the mains, of a booster transformer having a series winding connected in series with said mains, and an exciting winding and means comprising a system of switches for connecting said exciting winding with and disconnecting it from the mains, each switch comprising two contact pieces, a resistance connected between said contacts, and a third contact, said third contacts being all electrically connected together, said switches being mechanically interconnected to permit when the exciting winding of the transformer is being disconnected from the system, first the connecting of the resistances between the mains and the exciting winding, thereupon the disconnecting of the exciting winding from the system and its simultaneous short circuiting to prevent inductive action of the booster transformer upon the system and to permit separation of the series winding from the system.

2. In an alternating current system, the combination with bus bars, mains and a booster transformer having a series and an exciting winding, and means for connecting said series winding in series with and disconnecting same from said bus bars and mains, a system of switches each having a switch lever connected with the exciting winding, a bank of contract pieces, and a resistance connected between the first two of the contact pieces, the last contact pieces of the switches being connected together, and the first contact piece of each switch being connected to said mains.

In testimony whereof I have signed my name to this specification in the presence of two witnesses.

WILLY ZEDERBOHM.

Witnesses:
 HENRY HASPER,
 WOLDEMAR HAUPT.